Nov. 20, 1945.  J. B. MINER  2,389,530
COMPARTMENT MEASURE
Filed June 6, 1944
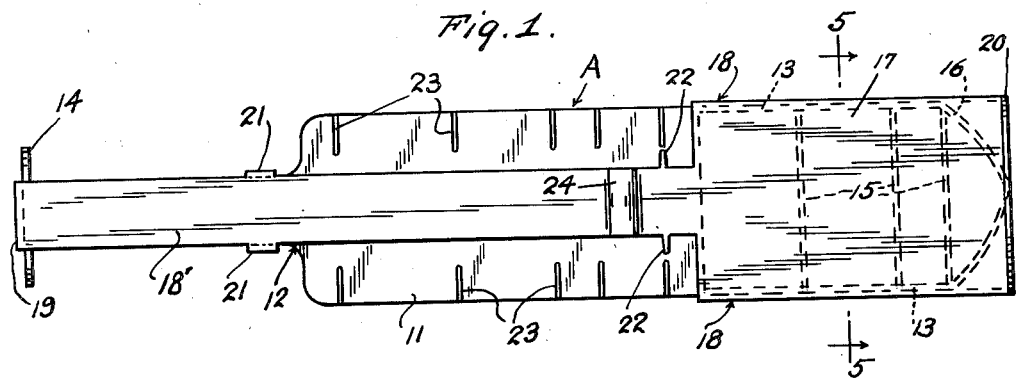
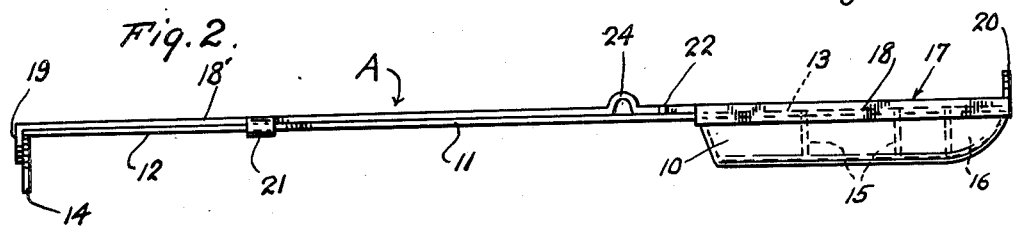
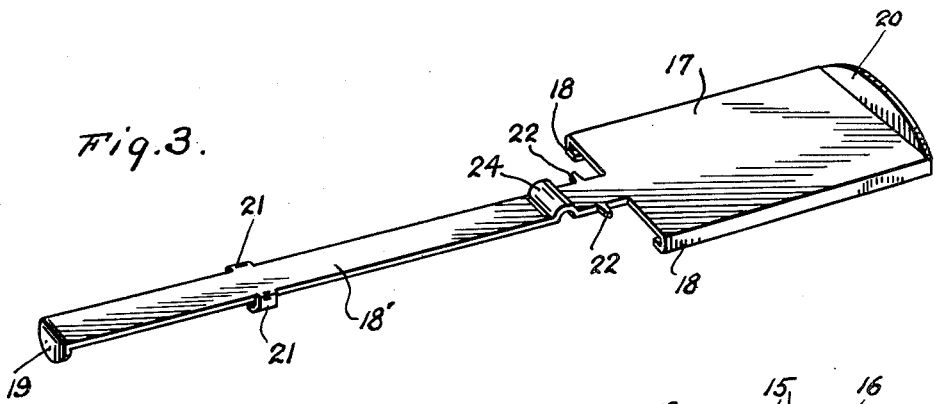
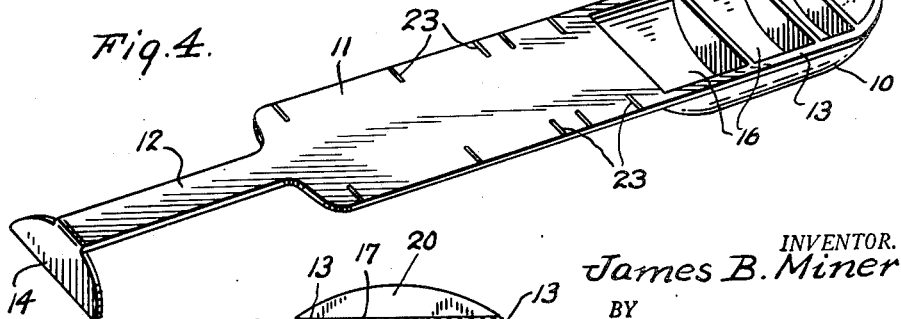
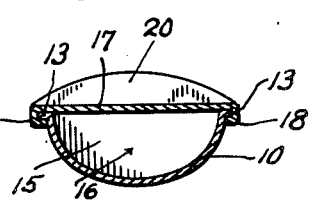
INVENTOR.
James B. Miner
BY
Victor J. Evans & Co.
ATTORNEYS Patented Nov. 20, 1945

2,389,530

UNITED STATES PATENT OFFICE 2,389,530

COMPARTMENT MEASURE

James B. Miner, Portland, Oreg.

Application June 6, 1944, Serial No. 538,948

4 Claims. (Cl. 73—426)

The invention relates to a measuring instrument, and more especially to a device for measuring semi-solid or liquid materials, as well as pulverized substances.

The primary object of the invention is the provision of a device of this character, wherein there can be accurately measured materials or substances, either liquid or pulverized, and is adapted to be constructed from plastic material, cut, stamped or shaped for the purposes intended thereof.

Another object of the invention is the provision of a device of this character, wherein its body is fitted with a measuring gate so as to enable any surplus material or substance to be removed, so that a determined and accurate amount of such material or substance within a compartment can be held therein and thus relieving any over-dosing when the device is in use, the said device being manually handled and is susceptible of operation with dispatch.

A further object of the invention is the provision of a device of this character, which is simple in construction, thoroughly reliable and efficient in operation, strong, durable, readily and easily manipulated, assuring accuracy in the working thereof, possessed of few parts, and inexpensive to manufacture.

With these and other objects in view the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a top plan view of the device constructed in accordance with the invention.

Figure 2 is a side view thereof.

Figure 3 is a perspective view of the gate part.

Figure 4 is a perspective view of the body part of the device.

Figure 5 is a sectional view taken on the line 5—5 of Figure 1 looking in the direction of the arrows.

Similar reference characters indicate corresponding parts throughout the several views in the drawing.

Referring to the drawing in detail, A designates generally the device constructed in accordance with the invention, and comprises a main body part, preferably made from plastic material, cut, stamped or shaped to provide a spoon bowl-like end 10, a scale carrying flat plate-like intermediate portion 11, and a narrow handle end 12, opposite the end 10. This portion 11 is in the same plane and flush with an outturned marginal mouth rim 13 of the end 10. The rim 13, the intermediate portion 11, and the handle end 12 merge with each other, while the latter at its outer end is formed with a downturned substantially half circular shaped head 14 which constitutes a finger hold and stop.

The bowl-like end 10 interiorly thereof is formed with variably spaced upstanding dividing walls or partitions 15, which create within this end a series of measuring cavities 16 for determined quantities of material or substances when filling the same, these cavities being differently graduated from each other according to a standard measurement scale.

Slidably superimposed on the main body part is a measuring gate 17 having the side guides 18 slidably engaged with the side edges of the rim 13 on the bowl end 10 and the intermediate portion 11, while extending from this gate 17 to coincide with the handle end 12 is a narrow handle extension 18', having a downturned ear 19 for abutment with the head 14 when the gate completely closes the bowl end 10. The other end or that next to the bowl end 10 of the gate 17 is formed with an upturned lip 20 which will serve as a finger grip. The extension 18' is formed with guide clips 21 engaging the handle end 12 for the slidable interfitting of this extension with the latter.

The extension 18' is further provided with laterally projecting opposed scale pointers or indicators 22 for coacting with scale markings 23 provided on the reading face of the intermediate portion 11, so that the gate 17 can be accurately set to the markings 23, and thus open a selected cavity 16 within the bowl end 10 to permit the dispensing of a determined quantity of material or substance therefrom, in conformity to its measuring capacity. The gate 17 in its sliding movements scrapes any surplus material or substance from the bowl end 10 at the mouth rim 13 thereof to level the said substance or material, as may be confined within the cavities 16. The gate 17 is hand actuated.

The extension 18' is formed with an upstanding cross-rib 24 to function as a finger grip for convenience in moving the gate 17 to effect measuring operation of the device A.

The device A in its use is adaptable for measuring dry and liquid materials or semi-solid substances, the measuring being accomplished within the cavities 16 in the bowl end 10, as should be apparent from the foregoing when taken in connection with the drawing.

What is claimed is:

1. A device of the kind described, comprising a main body part having a bowl-like end, a plurality of transverse parallel partitions in the bowl-like end dividing the same into compartments having predetermined capacities for purposes of measurement, a scale marked plate-like intermediate portion and a handle end opposite the bowl-like end, and a gate slidably fitted to the body part for selective coverage of the compartments of the bowl-like end and co-active with the scale marked plate-like intermediate portion.

2. A device of the kind described, comprising a main body part having a bowl-like end, a plurality of transverse parallel partitions in the bowl-like end dividing the same into compartments having predetermined capacities for purposes of measurement, a scale marked plate-like intermediate portion and a handle end opposite the bowl-like end, a gate slidably fitted to the body part to move longitudinally thereof for selective coverage of the compartments of the bowl-like end and coactive with the scale marked plate-like intermediate portion, and a scale pointer on the gate co-acting with the scale markings on the said intermediate portion.

3. A device of the kind described, comprising a main body part having a bowl-like end, a plurality of transverse parallel partitions in the bowl-like end dividing the same into compartments having predetermined capacities for purposes of measurement, a scale marked plate-like intermediate portion and a handle end opposite the bowl-like end, a gate slidably fitted to the body part for selective coverage of the compartments of the bowl-like end and co-active with the scale marked plate-like intermediate portion, said partitions being unequal distances apart and said compartments having different predetermined capacities, a scale pointer on the gate co-acting with the scale markings on the said intermediate portion, a handle end on the gate coincident with the handle end of the body part, and means for slidably connecting the handle of the gate and the handle of the body.

4. A measuring spoon comprising a body portion formed with a plurality of measuring compartments longitudinally aligned on said body portion, said body portion being provided with a longitudinally extending shank member at one end, a cover element adapted to slide longitudinally on the shank member and on the top surface of the body member so as to at times cover any desired number of measuring compartments and to level the material in the compartments, said cover element being provided with means by which it is held slidably against the top of the body member.

JAMES B. MINER.